Patented Mar. 8, 1938

2,110,141

UNITED STATES PATENT OFFICE 2,110,141

PREPARATION OF ETHYL CHLORIDE

Walter E. Roush and Willard B. Morell, Midland, Mich., assignors to The Dow Chemical Company, Midland, Mich., a corporation of Michigan No Drawing. Application February 11, 1935, Serial No. 6,091

4 Claims. (Cl. 260—166)

The present invention relates to methods for the preparation of ethyl chloride by combining ethylene with hydrogen chloride.

The preparation of certain alkyl halides, particularly an ethyl halide, by the reaction of an olefine with a hydrogen halide has been carried out under a wide variety of conditions. For example, the reaction of ethylene with hydrogen bromide, in the presence of aluminum chloride, with the production of ethyl bromide, is described in an article by Gustavson in Journal für Praktische Chemie, Vol. 34, page 161, 1886. The analogous reaction of ethylene and hydrogen chloride in the presence of aluminum chloride is likewise described in this article. The production of alkyl chlorides by the reaction of hydrochloric acid on olefines, under anhydrous conditions, and under superatmospheric pressure, particularly in the presence of aluminum chloride, is described in U. S. Patent No. 1,518,182 to Curme. The preparation of ethyl chloride by combining ethylene and dry hydrochloric acid gas with the aid of catalysts, particularly aluminum chloride or ferric chloride, at superatmospheric pressures, and temperatures not exceeding 10° C., is described in U. S. Patent No. 1,637,972 to Suida.

We have found that the procedures recited in the foregoing publications, and in other published art pertinent thereto, are disadvantageous because they call for the use either of a catalyst such as aluminum chloride or ferric chloride, or of high pressures, or both. Of the catalysts mentioned, aluminum chloride can be used for only a short period of time because it is poisoned under the conditions of use after relatively small quantities of ethyl chloride have been obtained, while with ferric chloride the yields of ethyl chloride obtained are very low, i. e., about 5.0 per cent, based on the weight of ethylene passed over the catalyst. In the procedures where no catalyst is used, the pressures required to effectuate the reaction of the ethylene with hydrogen chloride are extremely high, ranging, as pointed out in the Curme patent, up to 160 atmospheres, or over 2200 pounds per square inch.

It is accordingly an object of the present invention to provide a procedure for the preparation of ethyl chloride by the combination of ethylene with hydrogen chloride wherein the use of high pressures and/or expensive and inefficient catalysts is eliminated; and to provide a procedure whereby high yields of ethyl chloride may be obtained at a single treatment or contact of ethylene with hydrogen chloride.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

Our invention comprehends the addition of hydrogen chloride to ethylene in the presence of a catalyst initially supplied as iron oxide. The iron oxide, usually ferric oxide, need not be pure, in fact, we have employed crushed iron ore such as hematite to great advantage because of the low cost at which it can be obtained. We have also used magnetic iron oxide in carrying out the reaction. Ferrous oxide can be employed, but because of its higher cost we usually employ the ferric compound. We have found that the iron oxide employed is not converted to the chloride during the course of the reaction. It is preferable to support the iron oxide catalyst in finely divided condition on an inert medium, such as asbestos, thereby to provide a maximum of exposed catalytic surface. We can also place the catalyst in a rotating drum, whereby the material is tumbled about and fresh surfaces continually exposed to the reacting gases. We have also determined that it is not necessary to use a pure ethylene gas in carrying out the reaction. For instance, in the preparation of ethyl chloride we have used a gas containing about 40 per cent by weight of ethylene, the balance being substantially hydrogen and methane.

We may carry out this addition reaction by passing the ethylene and hydrogen chloride, together, in the combining proportions or with a slight excess of hydrogen chloride, in the gaseous phase, into contact with our catalytic body; or either of the reactants may be commingled with the other in the presence of the catalyst. We prefer to carry out the foregoing procedures under anhydrous conditions, and at a temperature above the boiling point of ethyl chloride. However, the temperature in the reaction zone should not be permitted to rise to a point at which polymerization of the ethylene occurs with consequent lowered yields of ethyl chloride. The reaction can be carried out at atmospheric pressure, although pressures slightly thereabove, e. g., 2 to 10 atmospheres, may be used without disadvantage. Under the above conditions the ethyl chloride may be removed from the reaction zone as rapidly as it is formed, and collected by condensation.

As a specific example of the operation of our method for the preparation of ethyl chloride, we have prepared the same in the following manner:—An iron tube of about 1 inch inside diameter and 14 inches long was filled with a loosely packed mixture of asbestos wool and finely divided ferric oxide, in the ratio of about 15 parts by volume of asbestos to 1 part of iron oxide. The tube contained a total of 5 grams of iron oxide. For several hours we then passed into one end of the tube dry ethylene at the rate of 200 cubic centimeters per minute, and dry hydrogen chloride at the rate of 250 cubic centimeters per minute. The gases were at a temperature of about 25° C. prior to being passed into the reaction tube. The temperature in the reaction zone rose to and remained at about 50° C. during the course of the reaction. The pressure in the reaction zone was approximately atmospheric throughout the reaction. The gas evolved from the reaction tube was passed through alkali, then through a drying tube filled with calcium chloride and led into an acetone-carbon dioxide cooled receiver wherein the ethyl chloride condensed from the unreacted ethylene. The amount of unreacted ethylene coming through the condenser was measured, and the hydrogen chloride absorbed in the alkali calculated from a titration thereof. The yield of ethyl chloride obtained was about 90 per cent of theoretical based on the ethylene reacted.

In the same apparatus we have treated an impure olefiant gas obtained from the cracking of oil, after the olefines higher than ethylene had been removed therefrom. The gas, containing about 45 per cent by volume of ethylene, was passed into the tube at the rate of about 300 cubic centimeters per minute, and hydrogen chloride was passed thereinto at a rate of about 150 cubic centimeters per minute. Approximately the same reaction conditions as to temperature, pressure, etc., prevailed during the carrying out of this reaction. About 75 per cent of the ethylene in the gas was converted to ethyl chloride at a single pass. By increasing the time of contact of the gases with the iron oxide, substantially all of the ethylene in the impure gas mixture can be converted to ethyl chloride.

As an example of another mode of practicing our invention we have confined 60,000 cubic centimeters of ethylene in a suitable cylinder under pressure of slightly above 5 atmospheres, and passed thereinto 55,000 cubic centimeters of dry hydrogen chloride. The pressure cylinder contained 5 grams of finely divided iron oxide supported on asbestos fibers. After all of the hydrogen chloride had been passed into the cylinder, it was allowed to stand for a period of time and then vented through an acetone-carbon dioxide cooled receiver, wherein the ethyl chloride formed during the reaction condensed from the unreacted gas. We obtained 110 cubic centimeters of ethyl chloride in this manner. All of the ethylene reacted was converted into ethyl chloride, and the amount of total ethylene reacted was 72 per cent.

An example of still another way in which we may carry out our invention is as follows:—37.3 grams of ethylene and 48.5 grams of dry hydrogen chloride were confined together in a cylinder under pressure in the absence of iron oxide. No reaction between the gases occurred. The commingled gases from the cylinder were then vented through a ¾ inch inside diameter tube containing 5 grams of finely divided iron oxide suspended on asbestos fibers. The flow of gases through the tube was at the rate of about 500 cubic centimeters of gas per minute. From the gases issuing from the tube we condensed 74 cubic centimeters of ethyl chloride in a receiver cooled to —80° C., which amounts to 76.2 grams. Thus the conversion of ethylene to ethyl chloride was in this case 89 per cent of theoretical.

From the foregoing description and examples it is apparent that our procedure provides an economical, facile method for the preparation of ethyl chloride by the direct addition of hydrogen chloride to ethylene wherein a readily available, low-cost catalyst is employed. The iron oxide catalyst can be used continuously for long periods of time without loss of effectiveness due to poisoning or otherwise, and enables a high yield of ethyl chloride to be obtained at a single pass.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method for the preparation of ethyl chloride, the step which consists in reacting ethylene substantially free from other olefines with hydrogen chloride in the presence of a catalyst initially supplied as solid iron oxide, under moderate conditions of temperature and pressure.

2. In a method for the preparation of ethyl chloride, the step which consists in reacting ethylene substantially free from other olefines with hydrogen chloride in the presence of a catalyst initially supplied as solid iron oxide, under anhydrous conditions, and under moderate conditions of temperature and pressure.

3. In a method for the preparation of ethyl chloride, the step which consists in reacting ethylene substantially free from other olefines with hydrogen chloride in the presence of a catalyst initially supplied as solid iron oxide, under anhydrous conditions and at about atmospheric pressure and at a temperature at which substantially no polymerization of the ethylene occurs.

4. In a method for the preparation of ethyl chloride, the step which consists in reacting ethylene substantially free from other olefines with hydrogen chloride in the presence of a catalyst initially supplied as solid iron oxide, under anhydrous conditions, at about atmospheric pressure and at a temperature above 12° C. but below a temperature at which substantial polymerization of the ethylene occurs.

WALTER E. ROUSH.
WILLARD B. MORELL.